| United States Patent [19] | [11] 4,031,305 |
|---|---|
| DeMartino | [45] June 21, 1977 |

[54] POLYGALACTOMANNAN ETHER COMPOSITIONS

[75] Inventor: Ronald N. DeMartino, Wayne, N.J.

[73] Assignee: Celanese Corporation, New York, N.Y.

[22] Filed: Nov. 17, 1975

[21] Appl. No.: 632,339

[52] U.S. Cl. .................................... 536/114; 8/91; 162/178; 252/8.55 C; 252/8.9; 252/352; 252/8.5 C; 424/361; 426/573; 426/658; 536/122

[51] Int. Cl.[2] ........................................ C08B 37/00

[58] Field of Search ................... 260/234 R, 209 R; 536/114, 122

[56] References Cited

UNITED STATES PATENTS

| 2,806,857 | 9/1957 | Paschall | 536/114 |
|---|---|---|---|
| 3,622,564 | 11/1971 | Kittleman et al. | 260/234 R |
| 3,632,804 | 1/1972 | Gray et al. | 260/234 R |
| 3,686,164 | 8/1972 | Unger et al. | 260/234 R |
| 3,808,200 | 4/1974 | Bistline et al. | 260/234 R |
| 3,912,713 | 10/1975 | Boonstra et al. | 260/234 R |

*Primary Examiner*—Johnnie R. Brown

[57] ABSTRACT

This invention provides novel sulfohydroxypropyl ethers of polygalactomannans having a degree of substitution between about 0.01 and 3, and further provides a process for producing sulfohydroxypropyl ethers of polygalactomannan gums by contacting solid polygalactomannan gum with 3-halo-2-hydroxypropanesulfonic acid and alkali metal hydroxide or ammonium hydroxide under alkaline conditions in an aqueous solution of water-miscible solvent.

3 Claims, No Drawings

POLYGALACTOMANNAN ETHER COMPOSITIONS

BACKGROUND OF THE INVENTION

The polygalactommannans are polysaccharides composed principally of galactose and mannose units and are usually found in the endosperm of leguminous seeds, such as guar, locust bean, honey locust, flame tree, and the like. Guar flour, for example, is composed mostly of a galactomannan which is essentially a straight chain mannan with single membered galactose branches. The mannose units are linked in a 1-4-$\beta$-glycosidic linkage and the galactose branching takes place by means of a 1-6 linkage on alternative mannose units. The ratio of galactose to mannose in the guar polymer is, therefore, one to two. Guar gum has a molecular weight of about 220,000.

Locust bean gum is also a polygalactomannan gum of similar molecular structure in which the ratio of galactose to mannose is one to four. Guar and locust bean gum are the preferred sources of the polygalactomannans, principally because of the commercial availability thereof.

Polygalactomannan gums swell readily in cold water and can be dissolved in hot water to yield solutions which characteristically have a high viscosity even at a concentration of 1–1.5 percent. Guar gum and locust bean gum as supplied commercially usually have a viscosity (at 1% concentration) of around 1000 to 4000 centipoises at 25° C using a Brookfield Viscometer Model LVF, spindle No. 2 at 6 rpm.

For a number of commercial applications it is advantageous to have a gum that provides a solution viscosity lower than that imparted by the same gum in the form in which it is ordinarily sold commercially. Thus, for various food products wherein a polygalactomannan is incorporated as a thickener or is used in a gel or jelly-type product, it is desirable to employ a gum which has a one percent solution viscosity between about 1000 and 2000 centipoises at 25° C. Solutions having lower viscosities than those produced with conventional commercial gum are also advantageous in paper making procedures, either in the beater or when used as a sizing. Low viscosity solutions of polygalactomannan gums also find special application in the sizing and printing of textiles.

There are various other rigorous applications that require greater stability under variable conditions than is provided by hydrocolloid gums that are commercially available. For example, it is desirable that a gum which functions as a protective colloid or gelling agent in oil well drilling mud compositions and oil well fracturing compositions exhibit a degree of solution stability and heat stability under operating conditions.

Further, solutions of ordinary hydrocolloid gums are not sufficiently stable under variable conditions of pH and temperature or not sufficiently stable in the presence of polyvalent metal ions, to qualify for general application in the textile industry for sizing, printing and finishing operations, or in the paper industry as sizing and coatings agents.

Accordingly, it is a main object of the present invention to provide hydrocolloid gums having improved properties for applications in petroleum, textile, printing, paper, food and pharmaceutical industries.

It is another object of the present invention to provide polygalactomannan ether derivatives, and a process for their preparation.

It is another object of the present invention to provide guar gum and locust bean gum compositions containing sulfohydroxyalkyl ether substituents.

It is a further object of the present invention to provide anionic guar gum and locust bean gum compositions which are superior in solution stability and heat stability in comparison with unmodified guar gum and locust bean gum.

Other objects and advantages shall become apparent from the following description and examples.

DESCRIPTION OF THE INVENTION

One or more objects of the present invention are accomplished by the provision of a process for producing sulfohydroxypropyl ethers of polygalactomannan gums which comprises contacting solid polygalactomannan gum with 3-halo-2-hydroxypropanesulfonic acid and alkali metal hydroxide or ammonium hydroxide under alkaline conditions in a reaction medium comprising an aqueous solution of water-miscible solvent.

Whenever the following description refers specifically to guar gum, it is understood that the disclosure is applicable to other closely related polygalactomannan gums in general, and locust bean gum in particular.

By the term "degree of substitution" as employed herein is meant the average substitution of ether groups per anhydro sugar unit in the polygalactomannan gums. In guar gum, the basic unit of the polymer consists of two mannose units with a glycosidic linkage and a galactose unit attached to a hydroxyl group of one of the mannose units. On the average, each of the anhydro sugar units contains three available hydroxyl sites. A degree of substitution of three would mean that all of the available hydroxy sites have been substituted with sulfohydroxypropyl ether groups.

The etherification processes of the present invention are applicable to polygalactomannan gums in the form of finely divided powders or in the form of gum "splits".

Guar gum and other polygalactomannan hydrocolloids are derived from certain seeds of the plant family "leguminosae". The seeds are composed of a pair of tough, non-brittle endosperm sections referred to as "splits", between which is sandwiched a brittle embryo layer. The entire structure is enclosed in a tough seed coat.

The endosperm splits are extremely tough and non-brittle. This renders them difficult to reduce into a finely divided state. One method of separating the endosperm splits is described in U.S. Pat. No. 3,132,618. Methods of reducing endosperm splits into finely divided powder are described in U.S. Pat. Nos. 2,891,050; 3,455,899; and references cited therein.

In a preferred embodiment of the present invention, sulfohydroxypropyl ethers of guar gum or locust bean gum are prepared by contacting solid guar gum or locust bean gum with 3-halo-2-hydroxypropanesulfonic acid and a stoichiometric excess of alkali metal hydroxide or ammonium hydroxide in a reaction medium comprising an aqueous solution of water-miscible solvent, at a temperature between about 10° C and 100° C for a reaction period sufficient to achieve a degree of substitution of sulfohydroxypropyl ether groups between about 0.01 and 3.0.

The solid guar gum or other polygalactomannan which is etherified can be in the form of endosperm splits or in the form of finely divided powder which is derived from the endosperm splits. It is an important feature of the present invention process that the polygalactomannan gum being etherified with sulfohydroxyalkyl groups remains as a solid phase in the reaction medium during the reaction period.

The 3-halo-2-hydroxypropanesulfonic acid reactant in the etherification process is preferably employed in the form of either the 3-bromo or the 3-chloro substituted derivatives. The quantity of 3-halo-2-hydroxypropanesulfonic acid employed is determined by the degree of substitution which it is desirable to achieve. For example, the etherification of five parts by weight of guar gum with one part by weight of sodium 3-chloro-2-hydroxy-propanesulfonate nominally yields guar gum ether having a 0.07 degree of substitution. A higher relative weight ratio of sulfonate reactant to galactomannan gum yields a higher degree of substitution. Generally, the preferred degree of substitution is in the range between about 0.05 and 2.5.

The 3-halo-2-hydroxypropanesulfonic acid reactant is usually employed as a salt in the form of an alkali metal or ammonium sulfonate. As described in U.S. Pat. No. 2,806,857, the sulfonate reactant can be synthesized by the reaction of epichlorohydrin or epibromohydrin with a water soluble basic sulfite, e.g., a sodium or potassium sulfite or bisulfite. The reaction product so produced is recovered as an alkali metal 3-halo-2-hydroxypropanesulfonate.

In the preferred embodiment of the invention process described above, the etherification reaction between guar gum or locust bean gum and sulfonate reactant is conducted in the presence of a stoichiometric excess of alkali metal hydroxide or ammonium hydroxide. The alkali metal or ammonium hydroxide performs both as a reactant and as a catalyst. Normally, the hydroxide and the sulfonate reactant interact on an equimolar basis to form an epoxy sulfonate intermediate from the 3-halo-2-hydroxypropanesulfonate by removal of the elements of hydrogen halide. The epoxy sulfonate intermediate so formed then in turn reacts with the guar gum or locust bean gum hydroxy groups, thereby introducing sulfohydroxypropyl ether substituents into the polygalactomannan gum. This latter etherification reaction is catalyzed by the presence of excess alkali metal or ammonium hydroxide. This excess of hydroxide component which functions as a catalyst can vary in quantity between about 0.5 and 20 percent, based on the weight of polygalactomannan gum utilized. It is to be noted that an additional molar equivalent of hydroxide base would be required if unneutralized 3-halo-2-hydroxypropanesulfonic acid is employed in the process instead of the corresponding sulfonate salt.

The invention process is conducted in a two phase reaction system comprising an aqueous solution of a water-miscible solvent and water-soluble reactants in contact with solid polygalactomannan gum. The water content of the water-miscible solvent can vary in quantity between about 10 and 60 percent, depending on the particular solvent of choice. If more than an optimum quantity of water is present in the reaction system, then the polygalactomannan gum may swell or enter into solution, thereby complicating product recovery and purification.

The water-miscible solvent is introduced into the reaction system in an amount sufficient for the preparation of a dispersion of polygalactomannan gum which can be agitated and pumped. The weight ratio of water-miscible solvent to polygalactomannan can vary in the range between about 1.0 and 10 to 1, and preferably in the range between about 1.5 and 5 to 1.

Suitable water-miscible solvents for suspension of polygalactomannan gum in the invention process include alkanols, glycols, cyclic and acylic alkyl ethers, alkanones, dialkylformamide, and the like, and mixtures thereof. Illustrative of suitable water-miscible solvents are methanol, ethanol, isopropanol, secondary butanol, secondary pentanol, ethylenegylcol, acetone, methylethylketone, diethylketone, tetrahydrofuran, dioxane and dimethylformamide.

The invention process for sulfohydroxypropoxylating polygalactomannan gum is conducted at a temperature in the range between about 10° C and 100° C and preferably in the range between about 20° C and 60° C. For convenience, the process can be conducted at ambient temperature. At the lower temperatures the reaction rate is slower, and at the higher temperatures the reaction is faster but the formation of by-products is increased. The reaction time can be varied in the range between about 1 and 5 hours, and preferably in the range between about 2 and 4 hours.

The invention process can be conducted in either open or closed vessels equipped with stirrers in batch or continuous operation.

After the completion of the etherification reaction, the solid polygalactomannan ether product is separated from the fluid reaction medium by centrifugation or filtration. The solid product so recovered is preferably further treated and purified by washing with the same water-miscible solvent as previously employed in the process, and then by further washing with a more anhydrous form of the same solvent. It is preferred that the product mixture from the process be neutralized with an acid before the procedure of solvent washes. Acetic acid or other organic acid is advantageous for the neutralization step since it does not increase the ash content of the polygalactomannan ether product.

In comparison to the corresponding polygalactomannan gums from which the sulfohydroxypropyl ether derivatives are synthesized, the present invention hydrocolloid products have a lower viscosity, a greater degree of clarity, and are more stable under extreme conditions of pH and in the presence of polyvalent metal ions.

The invention hydrocolloid products are superior to conventional gums for application in petroleum, textile, printing, paper, food and pharmaceutical industries.

The following examples are further illustrative of the present invention. The reactants and other specific ingredients are presented as being typical, and various modifications can be derived in view of the foregoing disclosure within the scope of the invention.

EXAMPLE I

Purification Of Guar Gum

Guar gum is extracted with methanol to remove methanol-soluble oils. The guar gum so treated is wetted with isopropanol, then sufficient water is added slowly to form a 0.5% solution. After standing overnight, the solution is centrifuged at 8000 rpm for 30 minutes. The clear supernatant is decanted from the insoluble residue and filtered through glass fiber filter paper.

The filtrate solution is diluted with ethanol to precipitate the guar gum. The precipitate is filtered, dried, and ground in Wiley Mill through a 40 mesh screen.

The purified guar gum powder has less than 0.1% nitrogen content, and about 0.48% ash content. For the purposes of the present invention, the sulfohydroxypropyl ether derivatives can be produced from either the purified or unpurified guar gum.

EXAMPLE II

Preparation of 3-Chloro-2-hydroxypropanesulfonic acid

In the manner described in U.S. Pat. No. 2,806,857, epichlorohydrin (18.5 grams, 0.2 mole) and anhydrous sodium sulfite (25.2 grams, 0.2 mole) are mixed with 200 mls of water and stirred for 1 hour at 5° C. The resulting solution is concentrated to dryness under vacuum, and the product is recovered as sodium 3-chloro-2-hydroxypropanesulfonate.

EXAMPLE III

Preparation of Galactomannan Ethers

| Formulation reference | A | B | C | D |
|---|---|---|---|---|
| 50% Isopropanol | 1800 mls | 1800 mls | 1800 mls | 1800 mls |
| Guar gum | 300 grams | — | 300 grams | — |
| Locust bean gum | — | 300 grams | — | 300 grams |
| 50% Sodium hydroxide | 27 grams | 27 grams | 13.5 grams | 13.5 grams |
| Sodium 3-chloro-2-hydroxypropanesulfonate | 60 grams | 60 grams | 30 grams | 30 grams |

The galactomannan gum is slurried in the isopropanol solution, then heated to 40° C and purged for 1 hour with nitrogen. The caustic solution is added to the slurry, and the mixture is stirred for 10 minutes.

The sodium 3-chloro-2-hydroxypropanesulfonate reactant is added to the mixture, and the etherification reaction is conducted at 40° C over a period of 4 hours. The reaction mixture is neutralized to a pH of 8.3 with acetic acid, then filtered, washed twice with 50% isopropanol and once with 100% isopropanol. The galactomannan ether product is recovered and air-dried.

In comparison with the corresponding galactomannan gum starting materials, the galactomannan ether derivatives hydrate faster and reach peak viscosity more quickly. Also, the higher the degree of substitution of sulfo-2-hydroxypropyl ether groups in the galactomannan ether derivatives, the greater the stability under varying conditions of pH and temperature. The galactomannan ether derivatives of the present invention have the further advantages of improved solution stability and resistance to bacterial degradation.

A guar gum ether derivative produced in accordance with Formulation A hereinabove has a degree of substitution of 0.07 A 1% aqueous solution of this ether derivative, after standing at 25° C for 19 hours, has a viscosity of 4000 CPS.

EXAMPLE IV

Dispersive Property Of Anionic Galactomannan Ethers

Commerical guar gum is dissolved in water to produce a 0.48% aqueous solution (100 mls). In the same manner, a 0.48% solution is prepared with sulfo-2-hydroxypropyl ether of guar gum in accordance with Formulation A in Example I.

To each of the 0.48% solutions is added 50 mls of a 6% clay slurry. After one half hour, flocculation of clay is evident and there is settling of clay in the slurry mixture which contains regular guar gum. In the slurry mixture containing the present invention sulfo-2-hydroxypropyl ether of guar gum, no flocculation of clay is evident, and there is essentially no settling of clay under the test conditions.

These test results demonstrate that sodium guar-2-hydroxypropylsulfonate is an effective dispersant for clay slurries, while commercial guar gum is not.

EXAMPLE V

Oil Well Fracturing, Insoluble Residue Test

Sodium guar-2-hydroxypropylsulfonate produced in accordance with Formulation A hereinabove is dissolved in 400 mls of water to form a 0.5% aqueous solution. To the solution is added 0.01% by weight of hemicellulase enzyme, and the solution is aged overnight at 30° C, and then centrifuged. Supernatant liquid is decanted, and insoluble residue is recovered. The residue is slurried with water, then the residue is separated from the liquid, dried and weighed.

In the same manner a commercial guar gum is subjected to enzyme treatment, and residual solid is recovered and weighed for comparison purposes.

The weight of the insoluble residue from the invention guar ether sulfonate after enzyme treatment is 3.5%, based on the original weight of guar ether sulfonate.

By comparison, the weight of the insoluble residue from the commercial guar gum after similar enzyme treatment is 10.8%.

This comparison demonstrates that an invention sulfohydroxypropyl ether of polygalactomannan gum is better adapted than commercial guar gum for application as a gelling agent in oil well fracturing compositions. An invention polygalactomannan ether derivative is superior to unmodified guar gum because under oil well fracturing conditions it is more heat stable and it leaves much less clogging residue after enzyme treatment.

EXAMPLE VI

Solution Stability Evaluation

One percent aqueous solutions of sodium guar-2-hydroxypropylsulfonate (D.S. of 0.07) and commercial guar gum are prepared, and the solution viscosities are measured on a daily basis.

| Day | Guar sulfonate | Guar |
|---|---|---|
| 1 | 4550 | 4600 |
| 2 | 4700 | 500 |
| 3 | 4700 | no viscosity |
| 4 | 3800 | — |
| 5 | — | — |
| 6 | 3000 | — |
| 7 | — | — |
| 8 | 750 | — |
| 9 | no viscosity | — |

These viscosity evaluation results demonstrate that an invention sulfohydroxypropyl ether of polygalactomannan gum has superior solution stability in comparison to commercial guar gum.

EXAMPLE VII

Heat Stability And Viscosity Recovery Of Anionic Galactomannan Ethers

For a resin to perform well as a thickener in drilling muds, it must be stable at high temperatures for extended periods (i.e., in order to suspend solids in the drilling mud). Additionally, when the drilling mud is returned to the surface of the well, most of the viscosity should recover so that it is not necessary to add more resin thickener for reuse of the drilling mud.

These properties can be measured in a Fann 50B Viscometer (Fann Instrument Co., Houston, Tex.). This instrument monitors viscosity as a function of temperature.

Measurements were conducted on 1 percent aqueous solutions of guar and sodium guar-2-hydroxypropylsulfonate (300 RPM; pH=7; D.S. of 0.07) at 250° F, after the solutions were maintained at that temperature for 1 hour.

|  | Percent Viscosity Retained | Percent Recovery At Room Temp. |
|---|---|---|
| Guar | 2.9 | 38.8 |
| Sodium Guar-2-hydroxypropylsulfonate | 20.6 | 80.0 |

The viscosity measurements demonstrate that an invention sulfohydroxypropyl ether of polygalactomannan gum is superior to guar gum in heat stability and viscosity recovery properties for application as a thickner in oil well drilling muds.

What is claimed is:

1. Sulfo-2-hydroxypropyl ethers of guar gum and the alkali metal and ammonium salts thereof having a degree of substitution between about 0.01 and 3.0.

2. Sulfo-2-hydroxypropyl ethers of locust bean gum and the alkali metal and ammonium salts thereof having a degree of substitution between about 0.01 and 3.0.

3. Sulfo-2-hydroxypropyl ethers of polygalactomannan gum and the alkali metal and ammonium salts thereof having a degree of substitution between about 0.01 and 3.0.

* * * * *